(12) United States Patent
Graham et al.

(10) Patent No.: US 11,413,979 B2
(45) Date of Patent: Aug. 16, 2022

(54) ROBOTIC SYSTEMS AND METHODS FOR VEHICLE FUELING AND CHARGING

(71) Applicant: OLIVER CRISPIN ROBOTICS LIMITED, Altrincham (GB)

(72) Inventors: Andrew Crispin Graham, Badminton (GB); Christopher David Boyce, Bristol (GB); Peter John Nisbet, Bristol (GB); Jason Ralph Gordon Curle, Wotton under edge (GB); Trevor Owen Hawke, Bristol (GB)

(73) Assignee: OLIVER CRISPIN ROBOTICS LIMITED, Altrincham (GB)

( * ) Notice: Subject to any disclaimer, the term of this patent is extended or adjusted under 35 U.S.C. 154(b) by 295 days.

(21) Appl. No.: 16/730,334

(22) Filed: Dec. 30, 2019

(65) Prior Publication Data

US 2021/0197684 A1    Jul. 1, 2021

(51) Int. Cl.
*G05B 19/04* (2006.01)
*B60L 53/37* (2019.01)
(Continued)

(52) U.S. Cl.
CPC ............ *B60L 53/37* (2019.02); *B25J 9/1697* (2013.01); *B25J 13/06* (2013.01); *B25J 13/088* (2013.01);
(Continued)

(58) Field of Classification Search
CPC ...... B25J 13/06; B25J 13/088; B25J 15/0019; B25J 19/023; B25J 9/1697; B25J 18/06;
(Continued)

(56) References Cited

U.S. PATENT DOCUMENTS

| 3,364,940 A | 1/1968 | Ginsburgh et al. |
| 3,708,990 A | 1/1973 | Crooke |

(Continued)

FOREIGN PATENT DOCUMENTS

| CN | 101274733 A | 10/2008 |
| CN | 106956261 A | 7/2017 |

(Continued)

OTHER PUBLICATIONS

Graham, A.C. et al., Robotic Systems and Methods for Vehicle Fueling and Charging, GE co-pending U.S. Appl. No. 16/730,270, filed Dec. 30, 2019.

(Continued)

*Primary Examiner* — Harry Y Oh
(74) *Attorney, Agent, or Firm* — Fitch, Even, Tabin & Flannery LLP

(57) ABSTRACT

A robotic system for fueling or charging a vehicle having a vehicle connector, the robotic system including a robotic arm having a plurality of sequentially arranged articulated links and at least one group of operating cables extending from a proximal end of the arm to terminate at a control link, for controlling the position of that link, the cables each having a path comprising a passage in each successive more proximal link for closely receiving the cable, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system directs the robotic arm to engage the vehicle connector with the delivery connector and, upon engagement of the vehicle connector and delivery connector, the control system relaxes the robotic arm to an under-constrained condition.

15 Claims, 4 Drawing Sheets

(51) Int. Cl.
   *B60L 53/66* (2019.01)
   *B60L 53/65* (2019.01)
   *B25J 9/16* (2006.01)
   *B25J 13/06* (2006.01)
   *B25J 13/08* (2006.01)
   *B25J 15/00* (2006.01)
   *B25J 19/02* (2006.01)
   *G06Q 10/06* (2012.01)
   *G06Q 20/14* (2012.01)
   *G06Q 50/06* (2012.01)

(52) U.S. Cl.
   CPC ......... *B25J 15/0019* (2013.01); *B25J 19/023* (2013.01); *B60L 53/65* (2019.02); *B60L 53/665* (2019.02); *G06Q 10/06314* (2013.01); *G06Q 20/145* (2013.01); *G06Q 50/06* (2013.01)

(58) Field of Classification Search
   CPC ....... B25J 19/0029; B60L 53/37; B60L 53/65; B60L 53/665; B60L 2250/16; B60L 2250/30; B60L 53/14; B60L 53/305; B60L 53/36; G06Q 10/06314; G06Q 20/145; G06Q 50/06; B67D 2007/0423; B67D 2007/0425; B67D 2007/044; B67D 7/0401; B67D 7/34; Y02T 10/70; Y02T 10/7072; Y02T 90/12; Y02T 90/14; Y02T 90/16
   See application file for complete search history.

(56) References Cited

U.S. PATENT DOCUMENTS

| | | | |
|---|---|---|---|
| 4,393,728 A | 7/1983 | Larson et al. | |
| 6,237,647 B1* | 5/2001 | Pong | B67D 7/0401 |
| | | | 141/231 |
| 6,338,008 B1 | 1/2002 | Kohut et al. | |
| 6,371,148 B1 | 4/2002 | Tripp | |
| 6,382,269 B1 | 5/2002 | Tatsuno | |
| 6,431,226 B1 | 8/2002 | Koslowsky | |
| 6,496,755 B2 | 12/2002 | Wallach et al. | |
| 7,082,969 B1 | 8/2006 | Hollerback | |
| 8,205,522 B2 | 6/2012 | Buckingham et al. | |
| 8,393,362 B1* | 3/2013 | Hollerback | B25J 11/00 |
| | | | 141/94 |
| 8,977,393 B1 | 3/2015 | Kohler | |
| 10,207,411 B2 | 2/2019 | Michalakis | |
| 10,504,094 B1* | 12/2019 | Gaudin | G06Q 20/36 |
| 2003/0229420 A1 | 12/2003 | Buckingham et al. | |
| 2004/0195988 A1 | 10/2004 | Buckingham et al. | |
| 2008/0161971 A1 | 7/2008 | Buckingham et al. | |
| 2009/0095112 A1 | 4/2009 | Buckingham et al. | |
| 2009/0222133 A1 | 9/2009 | Buckingham et al. | |
| 2011/0066515 A1* | 3/2011 | Horvath | G06Q 20/204 |
| | | | 705/17 |
| 2011/0174108 A1 | 7/2011 | Graham et al. | |
| 2012/0043935 A1 | 2/2012 | Dyer et al. | |
| 2014/0067660 A1 | 3/2014 | Cornish | |
| 2015/0042278 A1 | 2/2015 | Leary | |
| 2015/0251551 A1 | 9/2015 | Mueller et al. | |
| 2015/0306974 A1 | 10/2015 | Mardall et al. | |
| 2016/0251213 A1 | 9/2016 | Corfitsen | |
| 2016/0375898 A1* | 12/2016 | Breuel | G08G 1/149 |
| | | | 340/932.2 |
| 2017/0008412 A1 | 1/2017 | Wu | |
| 2017/0362076 A1 | 12/2017 | Hall et al. | |
| 2018/0001777 A1 | 1/2018 | Kilic | |
| 2019/0275666 A1 | 9/2019 | Abramson | |
| 2019/0341661 A1 | 11/2019 | Guerra et al. | |
| 2020/0284599 A1* | 9/2020 | Cyr | G01C 21/3469 |
| 2021/0192938 A1* | 6/2021 | Doerr | H04W 12/71 |
| 2021/0197683 A1 | 7/2021 | Graham et al. | |
| 2021/0198093 A1 | 7/2021 | Graham et al. | |

FOREIGN PATENT DOCUMENTS

| | | |
|---|---|---|
| CN | 107002949 A | 8/2017 |
| CN | 107322584 A | 11/2017 |
| CN | 108973724 A | 12/2018 |
| CN | 109435730 A | 3/2019 |
| DE | 102016014463 A1 | 6/2018 |
| EP | 0974940 A2 | 1/2000 |
| KR | 100883889 B1 | 2/2009 |
| KR | 20190113697 A | 10/2019 |
| WO | 2010001107 A3 | 1/2010 |

OTHER PUBLICATIONS

Graham, A.C. et al., Robotic Systems and Methods for Vehicle Fueling and Charging, GE co-pending U.S. Appl. No. 16/730,306, filed Dec. 30, 2019.

OC Robotics, "Ringhals Case Study—snake arm robot" published as YouTube video url: https://www.youtube.com/watch?v=KsNeLB-EHsg&feature=youtu.be, Apr. 20, 2011.

* cited by examiner

ROBOTIC SYSTEMS AND METHODS FOR VEHICLE FUELING AND CHARGING

FIELD OF THE INVENTION

The present subject matter relates generally to robotic systems and methods for vehicle fueling and charging. More particularly, the present subject matter relates to a robotic system for fueling or charging a vehicle in an autonomous fashion.

BACKGROUND OF THE INVENTION

Many vehicles in use today operate on a finite energy source such as a fossil fuel or an electrical charge stored on board the vehicle. As such, these vehicles require periodic replenishment of their stored supply of fuel or electrical charge.

Replenishment typically requires parking the vehicle in proximity to a source of fuel or electric current for a predetermined amount of time sufficient to replenish the vehicle's energy source. Replenishment also typically requires establishing a connection between a receptacle in or on the vehicle and a conduit capable of delivering fuel or electrical current to the vehicle. This is typically a manual process requiring human intervention, as well as some familiarity with both the vehicle and with the available replenishment equipment.

The replenishment operation can give rise to certain hazards, such as a loss of connectivity and spillage or fluid or electrical arcing, incorrect selection of fueling or charging equipment, and inadvertent movement of the vehicle during replenishment.

Accordingly, there remains a need for improved systems and methods of fueling and charging vehicles which deliver enhanced safety, reliability, and ease of use.

BRIEF DESCRIPTION OF THE INVENTION

In one aspect, a robotic system for fueling or charging a vehicle having a vehicle connector, the robotic system including a robotic arm having a plurality of sequentially arranged articulated links and at least one group of operating cables extending from a proximal end of the arm to terminate at a control link, for controlling the position of that link, the cables each having a path comprising a passage in each successive more proximal link for closely receiving the cable, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system directs the robotic arm to engage the vehicle connector with the delivery connector and, upon engagement of the vehicle connector and delivery connector, the control system relaxes the robotic arm to an under-constrained condition.

In another aspect, a robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the delivery connector has a plurality of connection configurations which are capable of being selected in response to information about the vehicle connector.

In another aspect, a robotic system for charging a vehicle having a vehicle connector, the robotic system including a robotic arm, a flexible cable operably connected with the robotic arm for delivering an electrical current to a vehicle, the cable being connected to a source at a first end and a delivery connector at a second end, a flexible conduit operably connected with the robotic arm for delivering a fluid to the vehicle, the conduit being connected to a source at a first end and a delivery connector at a second end, and a control system for operating the robotic arm, the cable, and the conduit, wherein the control system activates the flexible conduit to deliver the fluid to the vehicle to control battery temperature while the flexible cable delivers the electrical current to the vehicle.

In yet another aspect, a robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a sensor for detecting movement of the vehicle, and wherein the control system directs the robotic arm to engage the delivery connector with the vehicle connector and, upon detecting movement of the vehicle beyond a predetermined threshold, the control system initiates an action to prevent damage to the vehicle or the robotic system.

In another aspect, a robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system is capable of selecting a proper source in response to information about the vehicle.

In another aspect, a robotic system for fueling or charging a vehicle having first and second vehicle connectors, the robotic system including a robotic arm, a first flexible conduit operably connected with the robotic arm for delivering a fuel or an electrical current, respectively, to a vehicle, the first flexible conduit being connected to a first source at a first end and a first delivery connector at a second end, a second flexible conduit operably connected with the robotic arm for delivering an ancillary fluid to the vehicle, the second flexible conduit being connected to a second source at a first end and a second delivery connector at a second end, and a control system for operating the robotic arm, the first conduit, and the second conduit, wherein the control system activates the first flexible conduit to deliver the fuel or electrical current to the vehicle and activates the second flexible conduit to deliver the ancillary fluid to the vehicle.

In yet another aspect, a robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a sensor for detecting a connection failure between the delivery connector and the vehicle connector, and wherein the control system directs the robotic arm to engage the delivery connector with the vehicle connector and, upon detecting a connection failure, the control system initiates an action to prevent a hazard.

In a further aspect, a robotic system for fueling or charging a vehicle having a vehicle connector, the robotic system having a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a sensor for identifying the vehicle and determining whether the vehicle is authorized to use the robotic system.

In yet a further aspect, a robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a sensor for detecting a position of the vehicle relative to the robotic system, and wherein the control system provides instructions to the vehicle or a vehicle operator to position the vehicle properly for fueling or charging.

In still a further aspect, a robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a communication device to signal potential users when the robotic system is available for use.

In yet a further aspect, a robotic system associated with a first vehicle for fueling or charging a second vehicle having a vehicle connector, the robotic system including a robotic arm mounted to the first vehicle, the robotic arm having a plurality of sequentially arranged articulated links and at least one group of operating cables extending from a proximal end of the arm to terminate at a control link, for controlling the position of that link, the cables each having a path comprising a passage in each successive more proximal link for closely receiving the cable, a flexible conduit operably connected with the robotic arm for delivering a fluid or an electrical current, respectively, to the second vehicle, the conduit being connected to a source at a first end and a delivery connector at a second end, and a control system for operating the robotic arm and the hose or cable, wherein the control system directs the robotic arm to engage the vehicle connector with the delivery connector and, upon engagement of the vehicle connector and delivery connector, the control system relaxes the robotic arm to an underconstrained condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

DETAILED DESCRIPTION OF THE INVENTION

Figure 1:
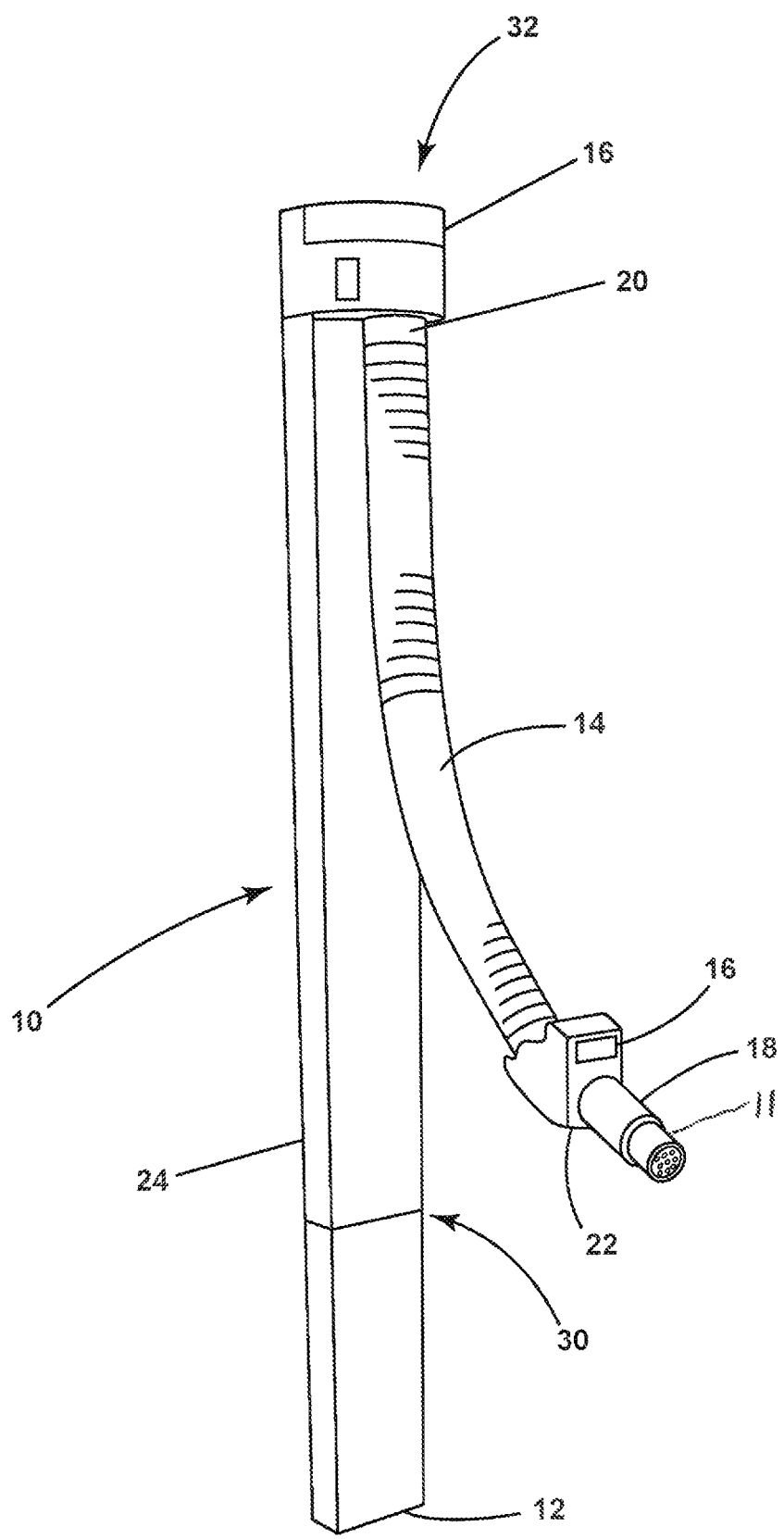
FIG. 1 is a perspective view of an exemplary embodiment of a robotic system for fueling or charging a vehicle, according to an aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Various aspects of the invention are explained more fully with reference to the exemplary embodiments discussed below. It should be understood that, in general, the features of one embodiment also may be used in combination with features of another embodiment, and that the embodiments are not intended to limit the scope of the invention.

FIG. 1 is a perspective view of an exemplary embodiment of a robotic system 10 for fueling or charging a vehicle, according to an aspect of the present disclosure. In the embodiment shown in FIG. 1, the robotic system 10 includes a mounting location 12 which in the environment depicted takes the form of a ground-based foundation. Other mounting locations, such as a wall, are also suitable. The robotic system 10 further includes a robotic arm 14 having a first end 20 and a second end 22. The second end of the robotic arm 14 includes a delivery connector 18, and the robotic system 10 may include one or more sensors 16 associated with a control system 32, the purpose of which will be described hereafter. A support pedestal 24 extends upwardly from the mounting location 12 to support the robotic arm 14. In the embodiment shown in FIG. 1, the support pedestal 24 is telescopic, and includes a telescopic joint 30, enabling the support pedestal to change length at controlled speeds to any value between two limiting values of length as may be necessary to enable the proper fueling or charging connection to be accomplished.

Robotic arm 14 is associated with, or contains, a flexible conduit 11 operably connected with the robotic arm 14 for delivering a fluid, such as a fuel, or electrical current to a vehicle. Fluids may take many forms including gases or liquids, and common fuels in gaseous or liquid form would include gasoline, diesel fuel, kerosene, jet fuels, natural gas, propane, hydrogen, etc. The electrical current may be alternating or direct current of suitable amperage and voltage.

The robotic arm 14 may take many forms. However, a type of robot called a "snake-arm robot" may be particularly advantageous for use in a robotic system 10 for reasons such as those discussed hereafter.

A snake-arm robot comprises a work head adapted to carry a tool or examination element for work or examination at a site, a support arm for the work head, the arm being adapted to reach the site to position the work head in a desired operating position, operating means for operational control of the work head and control means for controlling the attitude and positioning of the arm, wherein the support arm comprises at least one segment having a plurality of links, each link being articulated with respect to its neighbor and means for controlling the position and/or attitude of the segment relative to a datum thereby enabling the arm to follow and adapt to a predetermined path or shape.

Robotic arms of this type are frequently referred to as "Snake Arms", since they have the ability to advance longitudinally along their own length thus enabling them to follow a serpentine path. This has the advantage that arms of this type may be used in circumstances where access to a work site is severely restricted. However, snake-arm robots can also move in other modes than advancing longitudinally along a path, for example by changing the attitude and position of the arm without moving the base to cause the arm to move along a predetermined path. In some instances, the arm may move between two paths by interpolation of the two shapes. Still other movement schemes are possible with snake-arm robots.

The control means of one type of snake-arm robot comprises a multiplicity of tendons such as ropes or, more specifically, wire ropes or cables, each rope connected at one point within the plurality of links of the arm at one end of the rope, and connected to an actuator capable of applying force and displacement at the other end of the rope.

A known property of arms of this type controlled by ropes is that they can be adapted to enable the control of the stiffness of the arm by controlling the tension in one or more of the ropes in the arm, or by controlling the stiffness of other members or spring elements within the arm.

In other embodiments of arms of this type, spring means are provided, which cause the arm to be biased towards one shape, often a straight shape, when the ropes are slackened. The spring means may take the form of an elastic member through the arm, or a spiral spring member within or without the arm, or one or more springs acting in torsion or compression or tension between adjacent links or segments, or an inflatable chamber within the arm within which pressure is controlled in order to control the stiffness of the chamber.

In a particular embodiment of such a snake arm, the articulation of the links in each segment may be controlled with precision to enable the arm to follow a convoluted path to guide a work tool into, for example, a restricted access pathway within a machine or the human body.

In one aspect, the articulation may be a simple ball-and socket joint which will allow the segments to bend one with respect to the other. The articulation may incorporate means for securing one link with respect to the other. In an alternative embodiment, this securing feature may be dispensed with and the retention of the links within the segment structure may be by means of the spring means and/or by means of the tension means.

The spacing of the points of attachment of adjacent links along the length of the spring means and the stiffness of the spring means will clearly affect the flexibility of the finished arm.

Variable tension or compression characteristics may be imparted to the segment by employing spring means with controlled stiffness.

In a typical embodiment, three wires may be provided for the control of each segment. Each wire is attached to an actuator and extends from one end of the segment to the other, whereby operating the actuators to change the tension in the wires one relative to the other, causes or allows the links to flex thereby controlling the movement and shape of the segment. The application of differential tension between the wires causes or allows the segment to move or bend. Control means for the actuators may include software to cause or allow movement of the arm in a predetermined manner.

In the exemplary embodiments described herein, the robotic arm 14 is capable of maintaining desired shape and configuration to achieve a connection between the delivery connector 18 and the vehicle connector 110 (shown in FIG. 2) and, upon connection, the robotic arm "relaxes" to an under-constrained condition such that it is limp and compliant during the fueling or charging operation. This provides many advantages, such as permitting relative motion between the robotic system and vehicle in case of passengers or cargo entering or departing the vehicle during the fueling or charging operation. An under-constrained condition also permits the robotic arm 14 to move in response to human or mechanical contact, avoiding damage to either the arm itself or the person or item making contact.

Figure 2:
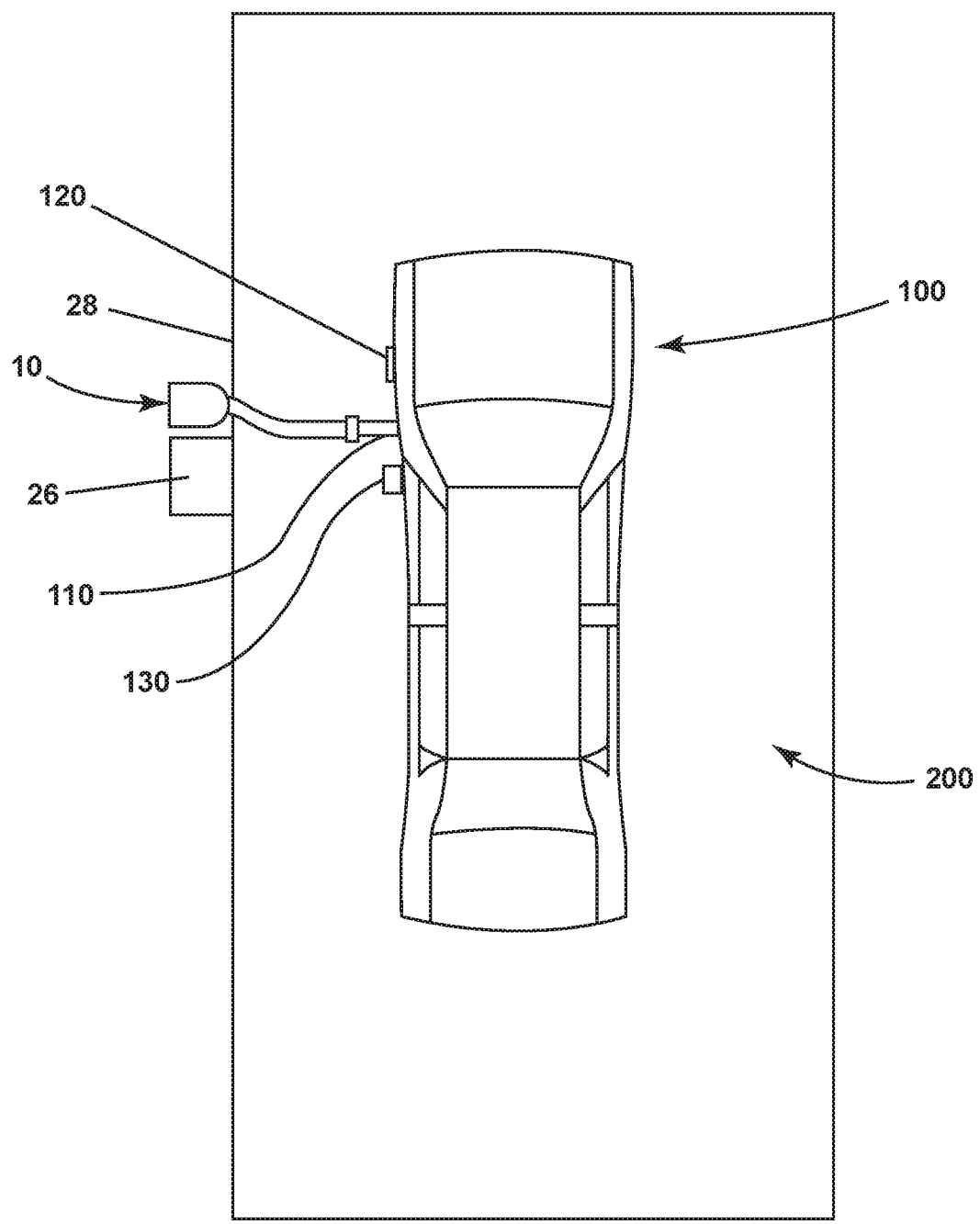
FIG. 2 is a plan view of the exemplary robotic system of FIG. 1 connected to a vehicle.

FIG. 2 is a plan view of the robotic system 10 of FIG. 1 connected to an exemplary vehicle 100 to perform a fueling or charging operation. In the scenario depicted in FIG. 2, the vehicle 100 and robotic system 10 are both located in a fueling or charging station 200, which may be a marked and designated pavement space or may be an enclosed space such as a carport or garage. Vehicle 100 in the scenario of FIG. 2 is in the form of an automobile, such as may be used for personal or business land-based transportation. In the configuration shown, the robotic system 100 is mounted to a wall 28 and a source 26 is shown in proximity to the robotic system 10. Source 26 may contain one or more fluids or fuels for delivery to the vehicle 100, or it may contain a source of electrical power such as an electrical circuit connected to a power grid or to a source of local power such as a generator, solar farm, wind generator, or the like.

In FIG. 2, the vehicle 100 also includes a vehicle connector 110 and a vehicle-mounted sensor 120. Vehicle-mounted sensor 120 may interface with the control system 32 of the robotic system 10 to aid in establishing a connection between the delivery connector 18 and the vehicle connector 110.

Delivery connector 18 may be of any suitable configuration and sized, shaped, and adapted to achieve a connection with a complementary vehicle connector 110. In the case of an electrical connection, the delivery connector may have one or more pins which interface with corresponding sockets of the vehicle connector, or vice versa. In the case of a fluid connection, the delivery connector may be a nozzle which fits into a filler tube on the vehicle, or vice versa.

For some applications, the delivery connector 18 could be a wireless charging connector which is configured to be placed by the robotic arm 14 into close proximity to a receiving coil associated with the vehicle 100, for inductive, radio, or resonance charging systems. Precise, close positioning of the delivery connector 18 can have a significant effect on power transfer and efficiency. In such wireless charging scenarios, the delivery connector 18 is considered to be "connected to" or "engaged with" the vehicle connector 100 when the delivery connector 18 is positioned in such proximity to the vehicle connector 110 that charging can take place.

In operation, the vehicle 100 is placed in proximity to the robotic system 10 and the control system 32 utilizing sensor inputs then operates the robotic arm 14 in an automated fashion to engage the vehicle connector 110 with the delivery connector 18 and begin the fueling or charging operation. The control system 32 then relaxes the robotic arm 14 to an under-constrained condition once connection has been achieved and then proceeds with the fueling or charging operation. When the fueling or charging operation is completed, as indicated by a sensor associated with the control system 32, the control system 32 resumes tension in the robotic arm 14 and disengages the delivery connector 18 from the vehicle connector 110 and moves the robotic arm 14 out of the way.

Many vehicles have different connector configurations. The robotic system 10 may include a plurality of different delivery connectors 18 which may be selected by the control system 32 in response to information about the vehicle 100. The delivery connector 18 may also be capable of achieving different connector configurations, such as changing size, shape, or interface configuration, in response to information about the vehicle 100.

During electrical charging operations, the operating temperature of the battery or other electrical storage system on board the vehicle may be important and may require the application of heat or removal of heat to maintain a desired operating range. Battery temperature may not be uniform throughout and some cells or regions may have higher or lower temperatures than others. The robotic system 10 may include the flexible conduit 11 in addition to an electrical cable associated with or incorporated into the robotic arm 14 in order to deliver a fluid to the vehicle through the conduit during the electrical charging operation to add heat to or remove heat from the vehicle and its battery and maintain a battery temperature within a desired range. Fluid delivery may be activated and deactivated by the control system 32 as required when a battery temperature reaches a predetermined threshold. Such a system may be most useful in very high power fast charging applications. In the event that a vehicle already contains a thermal control system, the robotic system 10 may work in conjunction with such onboard system or vehicle designers may design the onboard systems to be smaller and lighter if the vehicle itself is not required to carry a thermal management system capable of handling very high peak demands associated with very fast charging, especially when demands during normal operation are likely to be much lower.

While the robotic system 10 may tolerate a certain amount of relative motion between the vehicle 100 and the robotic system 10 during a fueling or charging operation, due to the robotic arm having a maximum length, the amount of relative movement tolerable is not infinite. The control system 32 may therefore include a sensor 16 to detect relative movement of the vehicle 100 and may initiate an action to prevent damage to the vehicle or the robotic system. Such an action may be to direct the robotic arm 14 to disengage the delivery connector from the vehicle connector when movement exceeds a predetermined threshold. Suitable sensors may include a video camera, radar, lidar, sonar, inertial (such as accelerometers, gyroscopic sensors), etc. The control system may also take action to inhibit vehicle movement through communication with vehicle onboard systems.

The robotic system 10 may have access to a plurality of sources, such as compartments within source 26, or multiple sources 26, which can provide a plurality of different electrical currents or a plurality of different fluids to vehicle 100. The control system 32 may be capable of selecting a proper source 26 in response to information about the vehicle 100 to deliver the appropriate current or fluid to the vehicle. A sensor 16 may identify the vehicle 100 and the control system may include stored information about various vehicles and the appropriate fluids or currents for fueling or charging them. A sensor 16 may also be capable of detecting vapors emitted from the vehicle to determine an appropriate fuel type present in the vehicle. This would enable the robotic system to work with vehicles about which no prior knowledge was available. In other examples, the vehicle may include radio-frequency identification (RFID) or other communication means designed to pass information to a fueling or charging source such as the robotic system 10. The robotic system 10 may thus be capable of performing a fueling or charging operation using vehicle identification along with prior knowledge of vehicle fueling or charging needs, obtaining knowledge from the vehicle without vehicle identification, and obtaining information about the fuel where no identification or communication is possible.

Vehicles 100 may utilize a variety of fluids for various purposes, such as fuel, hydraulic fluid, windshield washer fluid, power steering fluid, brake fluid, engine coolant, lubricant such as motor oil, and the like. Robotic system 10 may include a second conduit which is capable of delivering such an ancillary fluid to the vehicle before, during, or after the fueling or charging operation, or independently of a fueling or charging operation. The control system 32 may receive input from a sensor to determine the need for such ancillary fluids. The vehicle 100 may include one or more ports 130 for receiving one or more ancillary fluids.

If a failure of connection between delivery connector 18 and vehicle connector 110 occurs, the control system may detect such a failure and may initiate an action to prevent a hazard. A sensor such as a video camera or detector for detecting fuel vapors may be utilized. Actions may include stoppage of fluid or electrical current delivery and/or disengaging the delivery connector from the vehicle connector. The robotic system 10 may attempt to re-establish connection if a disengagement occurs.

The robotic system 10 may also include stored information about vehicles 100 which are authorized to use the system, to maximize usefulness or to prevent theft of resources. A sensor 16 may be used to identify vehicle 100 and the control system 32 may include information about vehicles which are authorized to use the robotic system. A sensor 16 may be a video camera, or may be capable of receiving a signal from the vehicle or an authorization code from a vehicle operator.

Robotic system 10 may include a sensor for detecting a position of the vehicle 100 relative to the robotic system and may provide instructions to the vehicle or vehicle operator to position the vehicle properly for the fueling or charging operation. A visual display associated with the robotic system or onboard the vehicle may be utilized to provide such instructions. A speaker may also be utilized to provide audible instructions to a vehicle operator. Control system 32 may also communicate with a smartphone application to provide instructions to a vehicle operator.

Vehicle operators may find themselves operating their vehicle 100 away from their normal base of operations and may find they require fueling or charging without having a predetermined location to receive fuel or an electrical charge. The control system 32 of the robotic system 10 may include a communication device to signal potential users when the robotic system is available for use. This signal may operate at predetermined times, or may operate whenever the robotic system 10 is not being utilized. The control system may also include a sensor for identifying the vehicle 100 and determining whether the vehicle is authorized to use the robotic system. The control system 32 may also include a billing system to collect a payment for charging or fueling a vehicle. The control system may also be capable of receiving an input from an owner or operator of the robotic system to block a fueling or charging operation.

Figure 3:
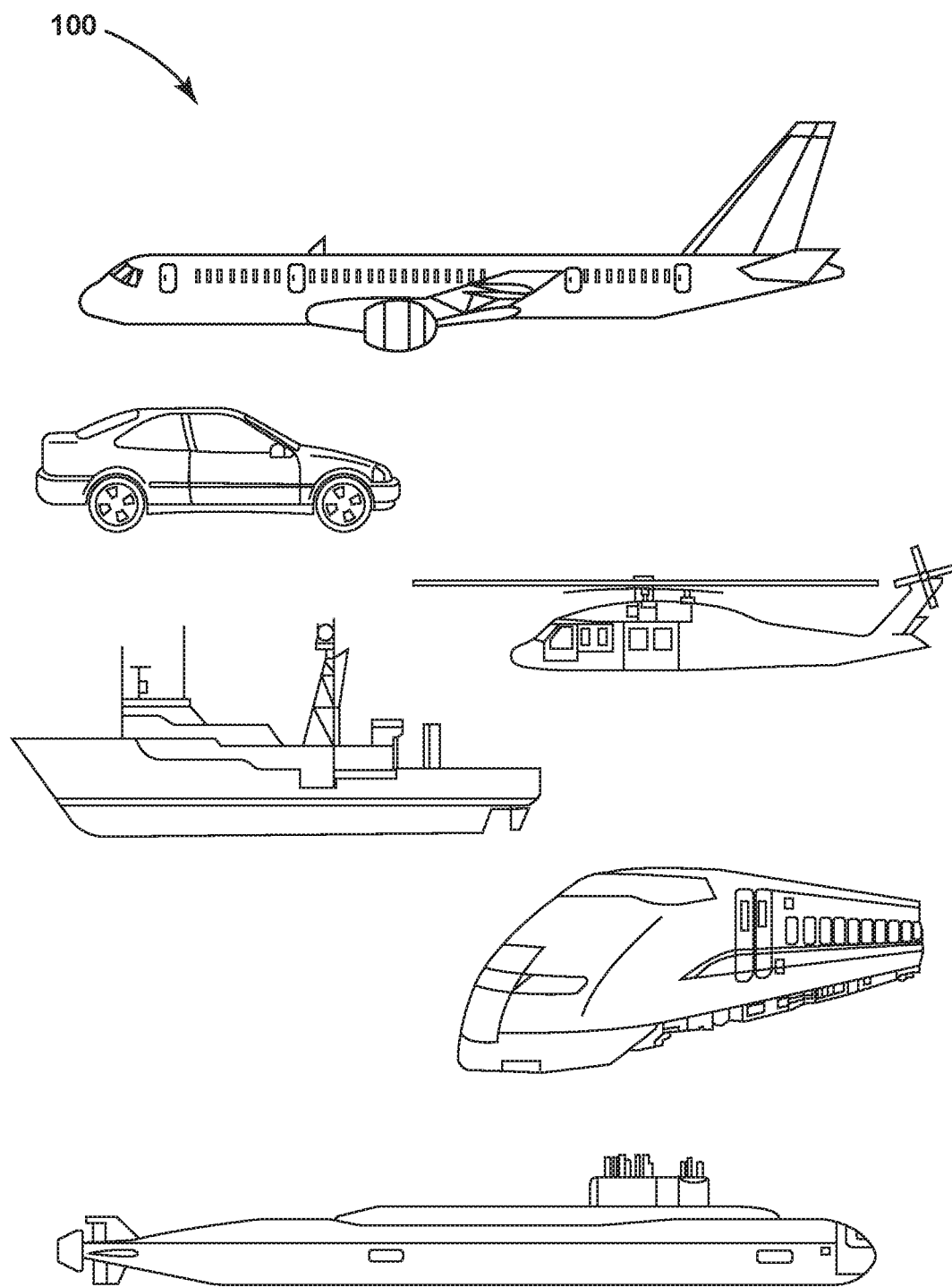
FIG. 3 is an exemplary illustration of various types of vehicles suitable for use with a robotic system for fueling or charging a vehicle as described herein.

FIG. 3 is an illustration of various types of vehicles 100 suitable for use with a robotic system 10 for fueling or charging a vehicle as described herein. As shown in FIG. 3, vehicles 100 may be land-based, airborne, or sea-going vehicles of any size or configuration. Vehicles 100 may also incorporate a robotic system 10 into an onboard configuration with a robotic arm 14 capable of connecting to a fixed location delivery connector. Vehicles 100 may also be outfitted with a robotic system 10 capable of connecting to another vehicle 100 outfitted with a vehicle connector, such that one vehicle 100 may refuel or recharge another vehicle 100 while both vehicles are in motion.

Figure 4:
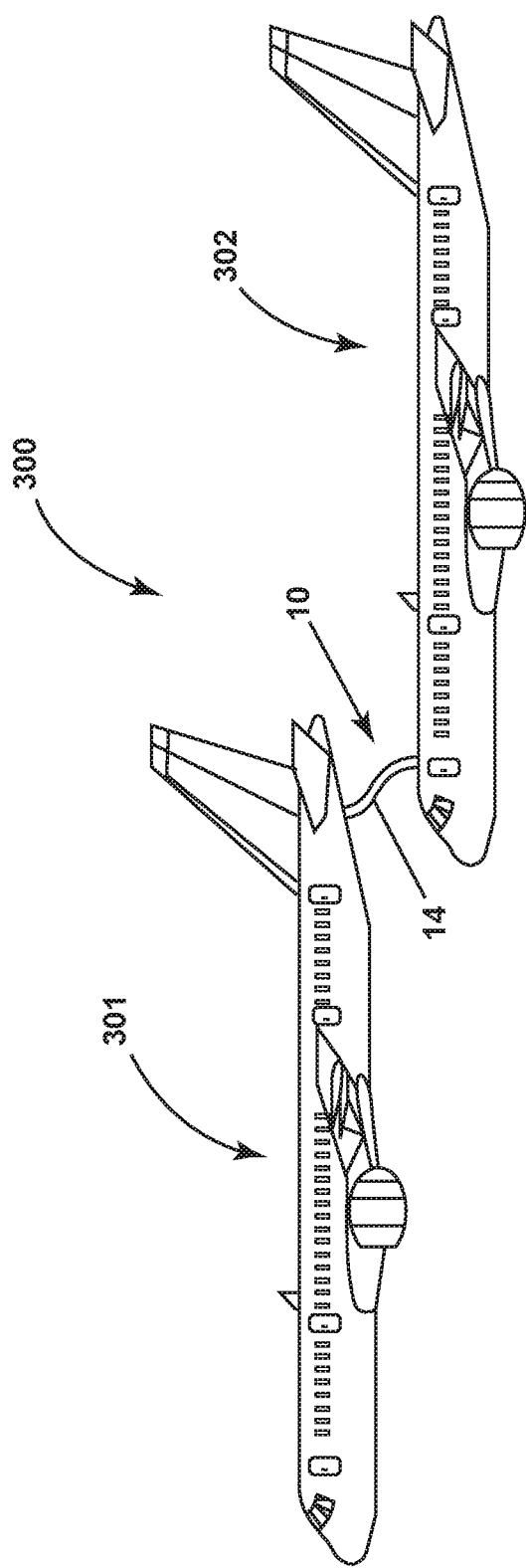
FIG. 4 is an exemplary illustration of a vehicle-mounted robotic system being utilized to fuel or charge a second vehicle as described herein.

One example of such a system is illustrated in FIG. 4, which depicts an exemplary aerial refueling system 300 where a tanker aircraft 301 may utilize a robotic system 10 with a robotic arm 14 associated with or containing a conduit or cable for recharging or refueling another aircraft 302 in flight. As previously described, the control system 32 may direct the robotic arm 14 to relax to an under-constrained condition once a connection has been made between the delivery connector 18 and the vehicle connector 110. This permits relative motion between the two vehicles, such as may occur when turbulence is encountered, without damage to either vehicle, to the robotic system 10, or to the connectors. The control system 32 may also include a sensor 16 for detecting the relative position of the vehicle to be fueled or charged and the robot arm 14, as well as a sensor for detecting completion of the fueling or charging operation.

These and many other applications are contemplated as being within the scope of the present disclosure.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

All of the features disclosed in this specification (including any accompanying claims, abstract and drawings), and/or all of the steps of any method or process so disclosed, may be combined in any combination, except combinations where at least some of such features and/or steps are mutually exclusive.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, materials and methods according to some embodiments are described herein.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Various characteristics, aspects, and advantages of the present disclosure may also be embodied in any permutation of aspects of the disclosure, including but not limited to the following technical solutions as defined in the enumerated aspects:

1. A robotic system for fueling or charging a vehicle having a vehicle connector, the robotic system including a robotic arm having a plurality of sequentially arranged articulated links and at least one group of operating cables extending from a proximal end of the arm to terminate at a control link, for controlling the position of that link, the cables each having a path comprising a passage in each successive more proximal link for closely receiving the cable, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system directs the robotic arm to engage the vehicle connector with the delivery connector and, upon engagement of the vehicle connector and delivery connector, the control system relaxes the robotic arm to an under-constrained condition.

2. The robotic system of Aspect 1, wherein the conduit is a hose.

3. The robotic system of Aspect 1, wherein the conduit is an electrical cable.

4. The robotic system of Aspects 1-3, wherein the control system includes a sensor for detecting the relative position of the vehicle and the robot arm.

5. The robotic system of Aspects 1-4, wherein the control system includes a sensor for detecting completion of the fueling or charging of the vehicle.

6. A robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the delivery connector has a plurality of connection configurations which are capable of being selected in response to information about the vehicle connector.

7. The robotic system of Aspect 6, wherein the delivery connector is capable of being reconfigured in response to information about the vehicle connector.

8. The robotic system of Aspects 6 or 7, wherein the delivery connector includes a plurality of delivery connectors of different configurations, and wherein the control system selects a delivery connector which is suitable for use with the vehicle connector.

9. The robotic system of Aspects 6-8, wherein the delivery connector is an electrical delivery connector which includes a plurality of pins or sockets, and the pins or sockets are capable of being configured in response to information about the vehicle connector.

10. The robotic system of Aspects 6-8, wherein the delivery connector is a nozzle, and the nozzle is capable of being configured in response to information about the vehicle connector.

11. A robotic system for charging a vehicle having a vehicle connector, the robotic system including a robotic arm, a flexible cable operably connected with the robotic arm for delivering an electrical current to a vehicle, the cable being connected to a source at a first end and a delivery connector at a second end, a flexible conduit operably connected with the robotic arm for delivering a fluid to the vehicle, the conduit being connected to a source at a first end and a delivery connector at a second end, and a control system for operating the robotic arm, the cable, and the conduit, wherein the control system activates the flexible conduit to deliver the fluid to the vehicle to control battery temperature while the flexible cable delivers the electrical current to the vehicle.

12. The robotic system of Aspect 11, wherein the fluid is a coolant fluid.

13. The robotic system of Aspects 11 or 12, wherein the control system includes a sensor for detecting a battery temperature.

14. The robotic system of Aspects 11-13, wherein the control system activates the flexible conduit to deliver the fluid when a battery temperature reaches a predetermined threshold.

15. The robotic system of Aspects 11-14, wherein the control system deactivates the flexible conduit and halts fluid delivery when a battery temperature reaches a predetermined threshold.

16. A robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a sensor for detecting movement of the vehicle, and wherein the control system directs the robotic arm to engage the delivery connector with the vehicle connector and, upon detecting movement of the vehicle beyond a predetermined threshold, the control system initiates an action to prevent damage to the vehicle or the robotic system.

17. The robotic system of Aspect 16, wherein the sensor is a video camera.

18. The robotic system of Aspects 16 or 17, wherein the action is disengagement of the delivery connector from the vehicle connector.

19. The robotic system of Aspects 16-18, wherein the action is inhibition of vehicle movement.

20. The robotic system of Aspects 16-19, wherein the sensor is a sonar, radar, lidar, or inertial system.

21. A robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system is capable of selecting a proper source in response to information about the vehicle.

22. The robotic system of Aspect 21, wherein the flexible conduit is a hose and the source is one of a plurality of sources containing different liquid fuels.

23. The robotic system of Aspect 21, wherein the flexible conduit is a cable and the source delivers different electrical currents.

24. The robotic system of Aspects 21-23, wherein the control system includes a sensor for identifying the vehicle.

25. The robotic system of Aspects 21-24, wherein the control system includes a sensor for detecting a type of fuel present in the vehicle.

26. A robotic system for fueling or charging a vehicle having first and second vehicle connectors, the robotic system including a robotic arm, a first flexible conduit operably connected with the robotic arm for delivering a fuel or an electrical current, respectively, to a vehicle, the first flexible conduit being connected to a first source at a first end and a first delivery connector at a second end, a second flexible conduit operably connected with the robotic arm for delivering an ancillary fluid to the vehicle, the second flexible conduit being connected to a second source at a first end and a second delivery connector at a second end, and a control system for operating the robotic arm, the first conduit, and the second conduit, wherein the control system activates the first flexible conduit to deliver the fuel or electrical current to the vehicle and activates the second flexible conduit to deliver the ancillary fluid to the vehicle.

27. The robotic system of Aspect 26, wherein the ancillary fluid is a windshield washer fluid, a hydraulic fluid, a coolant, or a lubricant.

28. The robotic system of Aspect 26 or 27, wherein the control system receives input from a sensor for detecting a need for an ancillary fluid.

29. The robotic system of Aspects 26-28, wherein the second source contains a plurality of ancillary fluids.

30. The robotic system of Aspects 26-29, wherein the second vehicle connector includes a plurality of ports for a plurality of ancillary fluids.

31. A robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a sensor for detecting a connection failure between the delivery connector and the vehicle connector, and wherein the control system directs the robotic arm to engage the delivery connector with the vehicle connector and, upon detecting a connection failure, the control system initiates an action to prevent a hazard.

32. The robotic system of Aspect 31, wherein the sensor is a video camera.

33. The robotic system of Aspects 31 or 32, wherein the action is a stoppage of fluid or electrical current delivery.

34. The robotic system of Aspects 31-33, wherein the sensor is capable of detecting fuel vapors.

35. The robotic system of Aspects 31-34, wherein the control system directs the robotic arm to disengage the delivery connector from the vehicle connector.

36. A robotic system for fueling or charging a vehicle having a vehicle connector, the robotic system having a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a sensor for identifying the vehicle and determining whether the vehicle is authorized to use the robotic system.

37. The robotic system of Aspect 36, wherein the sensor is a video camera.

38. The robotic system of Aspects 36 or 37, wherein the sensor is capable of receiving a signal from the vehicle.

39. The robotic system of Aspects 36-38, wherein the control system maintains a list of authorized vehicles.

40. The robotic system of Aspects 36-39, wherein the control system is capable of receiving an authorization code from an operator.

41. A robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a sensor for detecting a position of the vehicle relative to the robotic system, and wherein the control system provides instructions to the vehicle or a vehicle operator to position the vehicle properly for fueling or charging.

42. The robotic system of Aspect 41, wherein the control system provides instructions to the vehicle operator via a visual display.

43. The robotic system of Aspects 41 or 42, wherein the control system provides audible instructions to the vehicle operator.

44. The robotic system of Aspects 41-43, wherein the control system provides audible instructions to the vehicle operator via an onboard vehicle speaker system.

45. The robotic system of Aspects 41-44, wherein the control system provides instructions to the vehicle operator via a smartphone application.

46. A robotic system for fueling or charging a vehicle having a vehicle connector, the robotic system including a robotic arm, a flexible conduit operably connected with the robotic arm for delivering a fluid or an electrical current, respectively, to a vehicle, the conduit being connected to a source at a first end and a delivery connector at a second end, and a control system for operating the robotic arm and the hose or cable, wherein the control system includes a communication device to signal potential users when the robotic system is available for use.

47. The robotic system of Aspect 46, wherein the control system includes a sensor for identifying the vehicle and determining whether the vehicle is authorized to use the robotic system.

48. The robotic system of Aspects 46 or 47, wherein the control system communicates a schedule when the robotic system is available for use.

49. The robotic system of Aspects 46-48, wherein the control system includes a billing system to collect a payment for charging or fueling a vehicle.

50. The robotic system of Aspects 46-49, wherein the control system is capable of receiving an input from an owner or operator of the robotic system to block a fueling or charging operation.

51. A robotic system associated with a first vehicle for fueling or charging a second vehicle having a vehicle connector, the robotic system including a robotic arm mounted to the first vehicle, the robotic arm having a plurality of sequentially arranged articulated links and at least one group of operating cables extending from a proximal end of the arm to terminate at a control link, for controlling the position of that link, the cables each having a path comprising a passage in each successive more proximal link for closely receiving the cable, a flexible conduit operably connected with the robotic arm for delivering a fluid or an electrical current, respectively, to the second vehicle, the conduit being connected to a source at a first end and a delivery connector at a second end, and a control system for operating the robotic arm and the hose or cable, wherein the control system directs the robotic arm to engage the vehicle connector with the delivery connector and, upon engagement of the vehicle connector and delivery connector, the control system relaxes the robotic arm to an under-constrained condition.

52. The robotic system of Aspect 51, wherein the first vehicle and the second vehicle are aircraft.

53. The robotic system of Aspects 51 or 52, wherein the conduit is a hose or an electrical cable.

54. The robotic system of Aspects 51-53, wherein the control system includes a sensor for detecting the relative position of the vehicle and the robot arm.

55. The robotic system of Aspects 51-54, wherein the control system includes a sensor for detecting completion of the fueling or charging of the vehicle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A robotic system for fueling or charging a vehicle having a vehicle connector, comprising:
   a robotic arm;
   a flexible conduit operably connected with the robotic arm for delivering a fluid or an electrical current, respectively, to a vehicle, the flexible conduit being connected to a source at a first end and a delivery connector at a second end; and
   a control system for operating the robotic arm and the flexible conduit;
   wherein the control system includes a sensor for identifying the vehicle and determining whether the vehicle is authorized to use the robotic system;
   wherein the robotic arm is operated first in a state of tension before it is connected to the vehicle, and upon connection relaxes to an under-constrained condition, and upon completion of delivering the fluid or the electrical current resumes the state of tension.

2. The robotic system of claim 1, wherein the sensor is a video camera.

3. The robotic system of claim 1, wherein the sensor is capable of receiving a signal from the vehicle.

4. The robotic system of claim 1, wherein the control system maintains a list of authorized vehicles.

5. The robotic system of claim 1, wherein the control system is capable of receiving an authorization code from an operator.

6. A robotic system for fueling or charging a vehicle having a vehicle connector, comprising:
   a robotic arm;
   a flexible conduit operably connected with the robotic arm for delivering a fluid or an electrical current, respectively, to a vehicle, the flexible conduit being connected to a source at a first end and a delivery connector at a second end; and
   a control system for operating the robotic arm and the flexible conduit;
   wherein the control system includes a sensor for detecting a position of the vehicle relative to the robotic system; and
   wherein the control system provides instructions to the vehicle or a vehicle operator to position the vehicle properly for fueling or charging;
   wherein the robotic arm is operated first in a state of tension before it is connected to the vehicle, and upon connection relaxes to an under-constrained condition, and upon completion of delivering the fluid or the electrical current resumes the state of tension.

7. The robotic system of claim 6, wherein the control system provides instructions to the vehicle operator via a visual display.

8. The robotic system of claim 6, wherein the control system provides audible instructions to the vehicle operator.

9. The robotic system of claim 6, wherein the control system provides audible instructions to the vehicle operator via an onboard vehicle speaker system.

10. The robotic system of claim 6, wherein the control system provides instructions to the vehicle operator via a smartphone application.

11. A robotic system for fueling or charging a vehicle having a vehicle connector, comprising:
    a robotic arm;
    a flexible conduit operably connected with the robotic arm for delivering a fluid or an electrical current, respectively, to a vehicle, the flexible conduit being connected to a source at a first end and a delivery connector at a second end; and
    a control system for operating the robotic arm and the flexible conduit;
    wherein the control system includes a communication device to signal potential users when the robotic system is available for use;
    wherein the robotic arm is operated first in a state of tension before it is connected to the vehicle, and upon connection relaxes to an under-constrained condition, and upon completion of delivering the fluid or the electrical current resumes the state of tension.

12. The robotic system of claim 11, wherein the control system includes a sensor for identifying the vehicle and determining whether the vehicle is authorized to use the robotic system.

13. The robotic system of claim 11, wherein the control system communicates a schedule when the robotic system is available for use.

14. The robotic system of claim 11, wherein the control system includes a billing system to collect a payment for charging or fueling a vehicle.

15. The robotic system of claim 11, wherein the control system is capable of receiving an input from an owner or operator of the robotic system to block a fueling or charging operation.

* * * * *